May 12, 1970  D. F. HELM  3,511,968
COATED ARC WELDING ELECTRODE FOR MINIMIZING BOTH POROSITY AND
VARIATION IN COMPOSITION OF THE WELD METAL
AT THE START OF WELDING
Filed Oct. 3, 1968  2 Sheets-Sheet 1

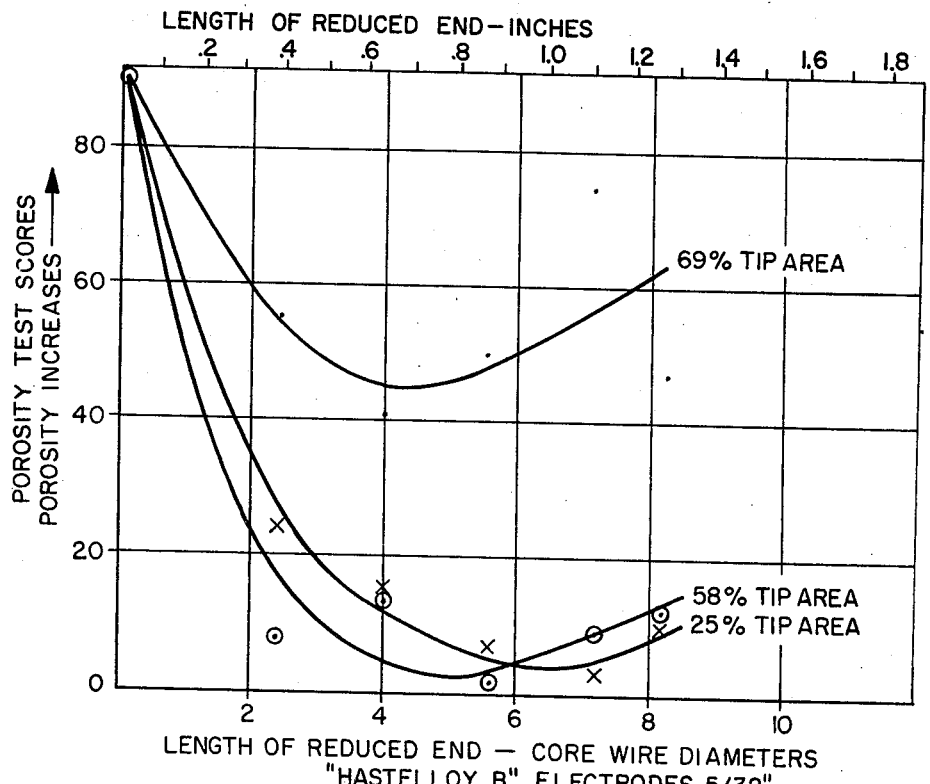

FIG. 1. STARTING POROSITY AS AFFECTED BY TIP AREA AND REDUCED END LENGTH OF CORE WIRE

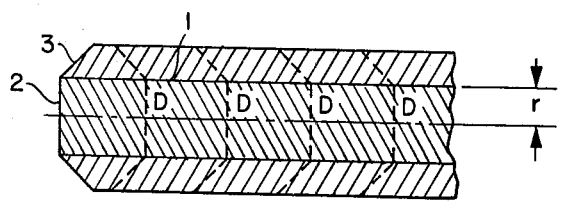

FIG. 2. PRIOR ART ELECTRODE

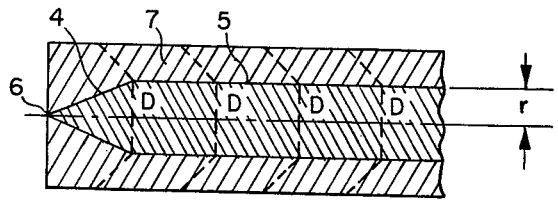

FIG. 3. PRIOR ART ELECTRODE

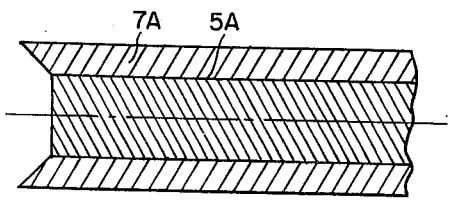

FIG. 4. PRIOR ART ELECTRODE AFTER REACHING STEADY STATE

DAVID F. HELM
INVENTOR
BY
Edward Hooper III
HIS ATTORNEY

United States Patent Office 3,511,968
Patented May 12, 1970

3,511,968
COATED ARC WELDING ELECTRODE FOR MINIMIZING BOTH POROSITY AND VARIATION IN COMPOSITION OF THE WELD METAL AT THE START OF WELDING
David F. Helm, Mount Lebanon, Pa., assignor to The McKay Company, Pittsburgh, Pa., a corporation of Pennsylvania
Filed Oct. 3, 1968, Ser. No. 764,687
Int. Cl. B23k 35/22
U.S. Cl. 219—146                    10 Claims

ABSTRACT OF THE DISCLOSURE

A coated arc welding electrode for minimizing both porosity and variation in composition of the weld metal at the start of welding comprising a core wire having a body of uniform cross-sectional area and a starting end portion of reduced cross-sectional area at one end of the body, the starting end portion having a length between about two times the diameter of the body of the core wire and about 1.25 inches, preferably between about two times the diameter of the body of the core wire and about .8 inch, the end surface or tip of the starting end portion having a cross-sectional area between about twenty and about seventy, preferably between about twenty-five and about sixty, percent of the cross-sectional area of the body, the starting end portion having less coating than an equivalent length of the body, the components of the electrode being proportioned so that the ratio of the quantity of coating consumed to the quantity of core wire consumed during the melting of the starting end portion is between about ninety and about one hundred ten, preferably between about ninety-five and about one hundred five, percent of the ratio of the quantity of coating consumed to the quantity of core wire consumed during the melting of the body of the electrode. The coating preferably is a stainless-low hydrogen type coating. Such relationship of the ratios of the quantity of coating consumed to the quantity of core wire consumed during melting may be established in the first increment of the length of the starting end portion equal to the diameter of the body of the core wire and continued through subsequent equal increments of the length of the starting end portion all the way to the body of the core wire. The outer surface of the coating on the starting end portion of the core wire is preferably of truncated cone shape. The starting end portion of the core wire is preferably of truncated cone shape.

---

Figure 5:
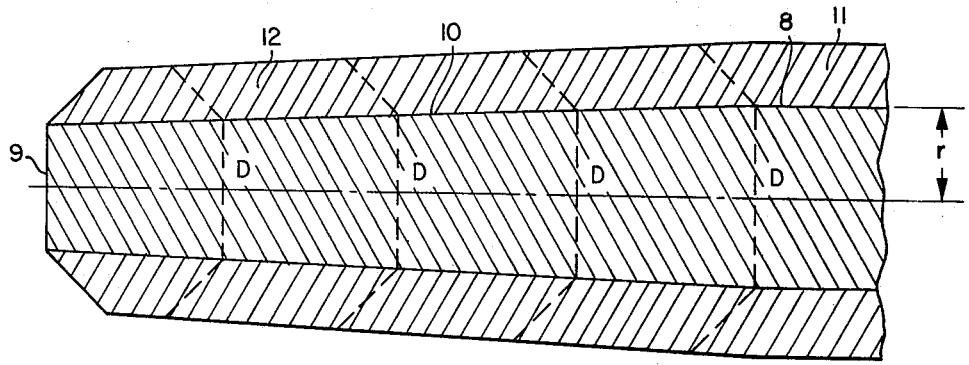

This invention relates to a coated arc welding electrode for minimizing both porosity and variation in composition of the weld metal at the start of welding. Such electrodes may be employed in shielded metal-arc welding.

The invention is especially applicable, although not limited to, electrodes used to deposit stainless steel alloys, nickel base alloys and mild and alloy steels, particularly those with relatively high strength levels. While the principles of the invention may be carried out with any coating, because they are now almost exclusively used for obtaining these highest quality weld deposits the electrode coatings usually employed are of the type known variously as carbonate-fluoride, basic or stainless-low hydrogen coatings. They produce high quality metal by means of good slag protection and carefully selected deoxidation metal and alloy additions and form the deposit metal under a protective gas shield which originates as carbon dioxide produced by the thermal decomposition of metallic carbonates in the coating such as limestone.

Coatings of the type above referred to which employ fluorides as fluxing agents for the carbonate residues have long been used, especially for highly alloyed deposits such as the stainless steels. When made without hydrogen containing materials and high baked for very good drying they have also in recent years come to be known as low hydrogen coatings and have been especially suitable for low alloy and unalloyed ferritic steel analyses as well. Many of these are metals of which the maximum perfection is desired. It is not unusual to find electrode deposits which are entirely satisfactory except for starting porosity or unreliable analyses occurring only in the very first portion of the bead. I have solved the problem and provided an electrode which minimizes both porosity and variation in composition of the weld metal at the start of welding.

Sensitiviey to starting porosity in general is a function of many factors, among which are:

(1) Electrical conditions of welding, especially current density on the electrode core wire;
(2) Temperature gradient in the base metal under the weld pool;
(3) Base metal plate thickness;
(4) Manipulation techniques employed by the weldor;
(5) Moisture content of the electrode;
(6) Coating ingredients, especially deoxidation metals;
(7) Volume of shielding gas and slag per unit of weld metal;
(8) Coating to core wire volume ratio.

All of these factors work together to produce a balance and compared with the later portions of the electrode some of the factors in this balance are distorted as the starting portion of the electrode is consumed.

The conventional manual coated electrode has a straight uniform core wire of constant diameter and a straight uniform coating of constant thickness except where stripped away for gripping by the holder and where ground away or "brushed back" at the striking end at an angle typically about twenty to forty-five degrees to facilitate easy striking of the arc. The removal of this small amount of coating is demanded by the weldor for his convenience and, in combination with the fact that the coating burns or melts off at an acute angle to the core wire to form a "cup" around the arc, results in less coating being consumed or melted per increment of length of core wire at the starting end portion than for the balance of the electrode. Because of this low coating-to-core wire melting ratio the weld metal initially deposited is undersupplied with those contributions which the coating is designed to make. Since the coating shields the arc and weld metal from porosity inducing contamination this coating deficiency tends to raise the porosity of the weld metal at the start of the weld. It is especially important that, compared with later weld metal which freezes slowly from a hot weld pool lying on a preheated plate, starting weld metal tends to trap porosity by freezing too rapidly from a cool weld pool losing heat to a cold plate. To rapidly raise the starting weld pool to a good working temperature requires that extra electrical energy per unit of weld metal be supplied at the start of the weld.

I provide a coated arc welding electrode for minimizing both porosity and variation in composition of the weld metal at the start of welding comprising a core wire having a body of uniform cross-sectional area and a starting end portion of reduced cross-sectional area at one end of the body, the starting end portion having a length between about two times the diameter of the body of the core wire and about 1.25 inches, preferably between about two times the diameter of the body of the core wire and about .8 inch, the end surface or tip of the starting end portion having a cross-sectional area between about twenty and about seventy, preferably between about twenty-five and about sixty, percent of the cross-sectional area of the body, the starting end portion having less coating than an equivalent length of the body, the components of the electrode being proportioned so that the ratio of the quantity of coating consumed to the quantity of core wire consumed during the melting of the starting end portion is between about ninety and about one hundred ten, preferably between about ninety-five and about one hundred five, percent of the ratio of the quantity of coating consumed to the quantity of core wire consumed during the melting of the body of the electrode. The coating preferably is a stainless-low hydrogen type coating. Such relationship of the ratios of the quantity of coating consumed to the quantity of core wire consumed during melting may be established in the first increment of the length of the starting end portion equal to the diameter of the body of the core wire and continued through subsequent equal increments of the length of the starting end portion all the way to the body of the core wire. The outer surface of the coating on the starting end portion of the core wire is preferably of truncated cone shape. The starting end portion of the core wire is preferably of truncated cone shape.

Other details, objects and advantages of the invention will become apparent as the following description of certain preferred embodiments thereof proceeds.

Figure 6:
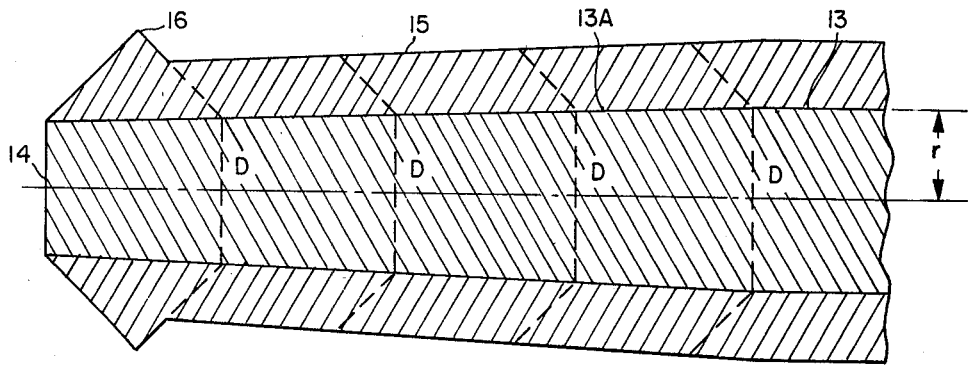
Figure 7:
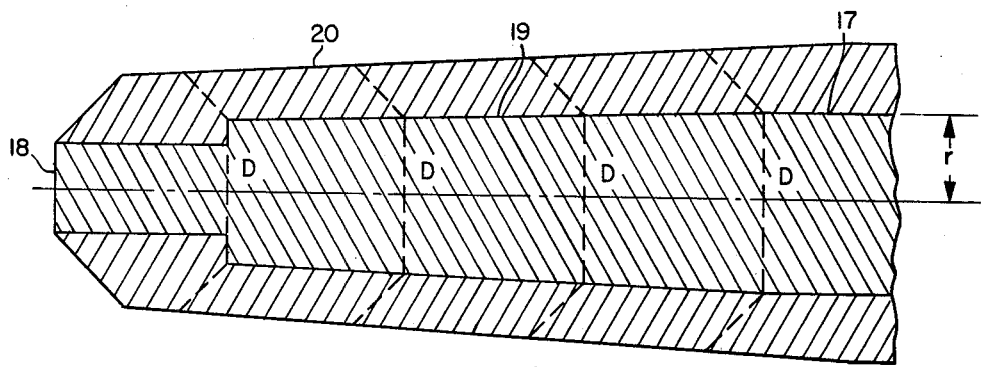

In the accompanying drawings I have shown certain present preferred embodiments of the invention in which:

FIG. 1 is a set of curves illustrating graphically the results of welding tests using electrodes having different tip areas in terms of percentage of the cross-sectional area of the core wire, plotting the length of the reduced end of the electrode against porosity of the weld metal;

FIGS. 2, 3, and 4 are diagrammatic cross-sectional views of prior art electrodes as hereinafter explained; and FIGS. 5, 6, and 7 are diagrammatic cross-sectional views of examples of my improved electrode as hereinafter explained.

A temporary and programmed elevation of the current density at the start of welding has a highly beneficial effect in minimizing starting porosity. The current density is most easily raised by reducing the electrode core cross section, and FIG. 1 shows graphically some porosity test scores secured with various reduced end lengths and end or tip areas used on a porosity prone electrode. For these tests a 5/32 inch nickel base core wire sold as "Hastelloy B" was coated by the extrusion process to a uniform outside diameter with a carbonate-fluoride low hydrogen coating. The core wire starting tip areas were 25%, 58% and 69% of the full cross-sectional area of the core wire and the ends were tapered over various test lengths. When a uniform procedure for the welding and scoring of starting porosity was employed all three tip sizes proved favorable, the two smaller tips producing the best results. The favorable reduced end lengths lay in the range of from about two times the diameter of the body of the core wire to about 1.25 inches; between about two times the diameter of the body of the core wire and about .8 inch represents a practical preferred range when both the amount of improvement and cost of end preparation are considered. Core wires with end cross sections somewhat smaller than 25% are still operable but tend to blast under the excessive current density and by depositing very little weld metal just postpone the problem of proper weld pool development.

The electrodes just described with reduced end section core wires which are helpful in the control of starting porosity and which have been coated by the extrusion process to a constant outside coating dimension bring weld analysis problems because over the starting portion there is an abnormally high ratio of coating to core. Since it is the coating which carries the deoxidation metal for the weld plus any intended alloy additions, when the coating is present in excess at the weld start then all metal additions are over-supplied to the weld deposit.

Overalloyed weld metals can have undesirable characteristics. For example, in a low-alloy steel weld metal, over-alloying can produce excessive hardness and low toughness. These hard, brittle regions may act as sites for cracking and brittle failure initiation. In stainless steel weld metals overalloying can produce unfavorable alloy content and ferrite content which in turn cause corrosion problems. Similarly underalloyed stainless steel weld metals can have poor corrosion resistance. In low-alloy steel deposits underalloying also has detrimental effects, with the underalloyed weld metal having low strength and low toughness.

I have found that a stainless-low hydrogen coated arc welding electrode, preferably having the coating conventionally brushed back for ease of striking, producing a weld deposit whose starting portion has both improved porosity and a deposit composition substantially equal to the balance of the deposit, can be secured by use of a core wire of uniform cross-sectional area except that it has a starting end portion of reduced cross-sectional area, such as one in the shape of a truncated cone, which produces an enhanced current density starting schedule, the length of the reduced section being about two times the diameter of the body of the core wire and about 1.25 inches and preferably between about two times the diameter of the body of the core wire and about .8 inch and the cross-sectional area at the starting tip being about 20 to 70% and preferably 25 to 60% that of the unmodified core wire, together with a reduced volume of coating over the reduced end core wire section, such as one in which the outer surface of the coating is of truncated cone shape, and the components of the electrode being proportioned so that the ratio of the quantity of coating consumed to the quantity of core wire consumed during the melting of the reduced core wire starting end portion (hereinafter called for brevity ratio A) is about 90 to 110% and preferably 95 to 105% of the ratio of the quantity of coating consumed to the quantity of core wire consumed during the melting of the portion of the core wire of uniform cross-sectional area (hereinafter for brevity called ratio B).

The dimensions given for the modified end core wire have been selected on the basis of (a) tests which have determined the best configurations by which the electrode current density is programmed over the starting portion of an electrode for porosity resistance and (b) practical considerations of the average time and amount of metal required for initial full weld pool development before the first weld metal starts to freeze.

The securing of a reduced cross section starting end portion on a core wire can be done in various ways as by pressing or grinding or by welding on a special end section.

A core wire starting area or tip about 20 to 70% of the full cross-sectional area of the core wire means a starting current density of 5 to 1.4 times normal. This is equivalent to an electrode one or more sizes smaller being run at a current density too high to be long supported but giving a hot start effective against porosity. The weld pool is developed to its working volume with the benefit of the extra energy, the current density returning to normal as the full electrode section is reached.

I employ over the starting end portion of reduced cross-sectional area of the core a reduced and generally corresponding volume of coating which during the melting of the core protects it by the usual proportionate quantities of shielding atmosphere and slag. Over this section as a whole the weld metal receives from the coating a metallic percentage contribution which is about equal to that received over the balance of the electrode since the coating to core wire ratios are kept about equal in the two regions. For sensitive analyses my invention permits ratio A to be held to about 95 to 105% of ratio B or even closer; for less critical analyses about 90 to 110% is generally satisfactory. By controlling the coating to core ratio over the starting portion of the electrode the weld metal deoxidation level and alloy content are maintained on a parity with the main portion of the electrode while at the same time a core wire current density pattern favorable for the reduction of porosity is being carried out. The correct proportioning of the coating over this section which is secured by a reduction in electrode diameter can be done in various ways as by applying coating with a uniform outside diameter over the entire electrode and selectively removing coating from the starting end section by grinding or brushing.

There have been proposed arc welding electrodes with deliberately pointed ends aimed at the prevention of electrode sticking and the reliable initiation of the arc with old fashioned weak power sources not designed to reliably power their way to a good start. One pointed end design which in some configurations bears a superficial resemblance to the present invention was proposed to deal with the problem of arc initiation of an electrode whose starting end was completely covered with coating. Such a situation does not occur with the modern extruded method of coating but did with the dipping method where the excess coating runs to the bottom, collects and covers the whole electrode end. To avoid the usual operation of baring the end by grinding and possibly stripping a fragile coating back too far, it was proposed to supply an arc starter point at the electrode tip which would be covered by the coating which drained to the bottom of the electrode and hardened there, which point in use would penetrate the coating under light pressure, touch the work piece and initiate the arc. Except that it provided a point to break through the coating, the conformation of the current conducting tip or its covering was immaterial.

My improvement differs completely in concept and critically in detail from this early practice in the following respects:

(a) I use a core wire reduced to no less than about 20% of its normal area which is much too large to act as a point.

(b) To deliver easy reliable arc initiation I preferably remove the electrode coating at the tip by grinding or brushing. The elimination of this step was the objective of the old practice.

(c) The reduced end of my electrode is specified to provide an effective current density program during the start up period. The old practice was satisfied with any pointed core conductor.

(d) I provide for a metered coating over the core wire reduced end, the coating volume being proportioned to that of the reduced end section. Coating quantity was not considered or controlled in the old practice, being deemed immaterial.

The deviations possible in previous electrodes in coating to core wire ratios and therefore of metallic deoxidizer and alloy additions made through the coating as well as the success of my invention in minimizing them are shown by the results of some calculations for coating metal pickup, comparing electrodes of my invention with examples of the prior art.

Referring to FIG. 2, 1 is the core wire of the common prior art type of coated electrode with a striking end 2. The full length of the electrode including the grip end is not shown. The coating is brushed back at an angle of about 45° from the striking end as shown at 3. Successive burn off lengths equivalent to one diameter of the core wire are shown at positions D and it is evident that when the arc is first struck there will be a deficiency of coating. When this core wire has a radius $r$ and the coating has a thickness of $.73r$ then except at the starting portion the ratio of coating to core is 2.00. If the coating forms a cup angle of 45° then, due to this and to the loss from brush-back, over the first length of one core wire diameter the ratio of coating to core volumes is fund by calculation to be only 1.21. Since a ratio of 2.00 is desired, at this point the weld metal is 39% low in metallic contributions from the coating. Each subsequent length of one core diameter carries its full complement of coating and is termed as standard and each length which the welder chooses or is able to incorporate into the starting weld pool improves the weld pool analysis by moving the ratio of coating melted to core wire melted closer toward the desired ratio of 2.00. If the welder moves the arc ahead and lets the weld metal solidify from a pool with three core diameters of metal in it the weld metal which starts to freeze is 13% low in the metallics which is should have received from the coating and after four core diameters it is still 10% low. In addition to depositing weld metal which is initially low in metallic contributions from the coating this prior art electrode is of course subject to the usual hazards of starting porosity.

FIG. 3 shows a prior art electrode intended to reduce starting porosity through the use of an initially high ratio of coating to core secured by placing a conical shape 4 on the core wire 5. The point 6, either sharp or slightly blunted, is exposed for striking but the coating 7 of uniform outside diameter is not brushed back for ease of striking as this would lower the coating to core ratio to which the porosity improvement is attributed. In contrast to the first prior art electrode discussed this electrode produces an initial deposit over-supplied with metallic additions from the excess of coating. The electrode of FIG. 3 has a core wire of radius $r$ bearing a conical point with an angle of about 53° which is in a preferred range and carries a coating of thickness $.73r$ over its unmodified or standard portion giving it a standard ratio of coating to core wire of 2.00. Over the first length of one core diameter it can be calculated that the contribution of metallics from the coating is 326% too high. If the welder builds up the weld pool by averaging together metal from four core wire diameters and then starts to move forward, the metal which starts to freeze is 24% too high in deoxidizer metal and alloy which has come from the excess of coating melted. It is seen that in an effort to reduce porosity this prior art electrode has created analytical variations in the weld deposit which are not acceptable in quality weld deposits.

FIG. 4 shows an electrode in the normal burn off configuration after the steady state condition has been reached. The core wire is 5A and the coating is 7A.

FIG. 5 shows one form of my improved electrode whose core wire, the body of which is designated 8, bears a reduced starting end portion 10 selected as being favorable for the reduction of starting porosity. The tip end 9 has an area equal to 50% of the cross-sectional area of the body of the core wire and increases to full section over a length of four core wire diameters. The core wire metal in the reduced starting end portion melts under an enhanced current density schedule to form a weld pool hotter than normal and porosity resistant. Over the body of uniform cross-sectional areas of the electrode the coating 11 has constant thickness. Over the starting end portion the coating 12 is progressively reduced in thickness to approximate coating to core wire ratio B. The precise ratio cannot be maintained at every point since some coating restoration must be made to compensate for the losses sustained in brush-back and cup formation and in FIG. 5 the required coating is smoothly averaged over the starting end portion of the core wire. However, over the starting end portion of the core wire as a whole the coating is proportioned to the wire so that a ratio A approximating ratio B is maintained between the two and between their joint metallic contributions to the weld deposit thus protecting the weld analysis from fluctuation.

In the use of my electrodes analytical control of the weld metal is accomplished at the same time a core wire current density schedule favorable to minimal porosity is being carried out. Electrodes of the prior art have had their exteriors determined by their usual manufacturing method and for extruded electrodes this meant a uniform outside diameter. If either the core wire volume or coating volume at the starting end were chosen for a special reason then the other was determined as it were by difference. Thus the electrodes of the prior art did not offer the power to choose a reduced end core wire for best porosity control and couple it with a coating volume best for analysis or composition control. My improved electrode delivers its superior results by exercising control over both the core wire and coating factors throughout the starting end portion.

The example of FIG. 5 illustrates an electrode whose body 8 has a core wire of radius $r$ and coating thickness of $.73r$ thus producing a coating to core ratio of 2.00. The core wire is tapered over four core wire diameters to a tip radius of $.707r$ making the tip cross sectional area 50% of that of the body of the core wire. Over the reduced starting end portion of the core wire the coating thickness drops to $.623r$ at the tip before being brushed back at a 45° angle for ease of striking. Calculation shows that over the first length of one core diameter the coating to core ratio is about 1.79, being low because of the coating lost in brush-back and cone development even though the core volume is reduced. The next three unit lengths have ratios respectively of 2.08, 2.05 and 2.01 which when blended in the starting weld pool with the first length bring the ratio to 1.98 for the reduced end section as a whole. Since the standard ratio is 2.00, by the time the reduced end section is melted, the average alloy content of the weld metal which has been deposited will be nearly 100% of the aim alloy content, i.e., neither underalloyed nor overalloyed by metallic contributions from the coating. Thus the example of FIG. 5 illustrates how my improved electrode achieves for the first time both a current density program favorable for starting porosity control and integrity of deposit chemistry at the start of the weld.

FIG. 6 shows another form of my improved electrode in which a desired ratio between coating and core is especially rapidly established and then the ratio is maintained over the balance of the reduced end portion of the electrode. The core wire 13 chosen for its favorable influence on starting porosity has a body of radius $r$ and a starting end portion 13A which over four core diameters is reduced to $.707r$ at the tip 14. Over the body of the core wire the coating has thickness $.73r$ which produces a desired coating to core ratio, in this example of 2.00. Except for the coating melted along with the first core length of one diameter, which may have a thickness as great as the thickness of the coating over the body of the core wire, and whose volume immediately compensates for the brush back and cup formation losses, the coating thickness is reduced over the reduced end section and is closely proportioned at a ratio of 2.00 by following a surface 15 which would have a radius of about $1.23r$ at the tip before brush back. At a distance of about one core wire radius back from the tip the coating has the full electrode diameter as shown at 16 from which point it is beveled at 45° in both directions, toward the tip thus forming the usual brush angle and also away from the tip until it intersects the proportioned coating surface 15. Such an electrode can be simply prepared from an extruded electrode by a tip brushing operation followed by a coating removal operation which does not extend to the electrode tip. With such an electrode configuration the desired coating to core ratio of 2.00 is closely approximated within the first length of one core diameter and this is then maintained or slightly corrected over the balance of the reduced end section.

Another form of my improved electrode which is favorable for the control of both starting porosity and analytical variations in the weld start is shown in FIG. 7. Like the configuration of FIG. 6 it quickly establishes a desired coating to core wire ratio, in this example of 2.00, and then maintains the ratio over the balance of the reduced end section. In FIG. 7, the core wire 17 of radius $r$ has been programmed to operate at four times the normal current density over the distance of one core wire diameter by employing a cylindrical tip section 18 of radius $.5r$. The balance of the reduced end section 19 is similar to that of FIG. 6. Over the standard portion of the electrode the coating has thickness $.73r$ producing a coating to core ratio of 2.00 which is closely maintained over three fourths of the reduced end core wire by following a surface 20 which would have a radius of about $1.23r$ at the tip before brush back. The high current density starting tip with its short cylindrical shape and small volume permits the presence of enough coating to compensate within one core diameter for losses due to brush back and cone formation and for the close approximation of the desired coating to core ratio of 2.00 which is then maintained or slightly corrected over the balance of the reduced end section.

For simplicity and economy of manufacture, I prefer that both the reduced-end core wires and the coatings have simple geometric shapes such as cylinders or truncated cones. The latter can be approximated by several cylindrical sections or by combinations of cylindrical and conical. However, various combinations of shapes can be used to accomplish the intent of my invention including but not being limited to unsymmetrical or rectangular cross sections.

While I have shown and described certain present preferred embodiments of the invention, it is to be distinctly understood that the invention is not limited thereto but may be otherwise variously embodied within the scope of the following claims.

I claim:

1. A coated arc welding electrode for minimizing both porosity and variation in composition of the weld metal at the start of welding comprising a core wire having a body of uniform cross-sectional area and a starting end portion of reduced cross-sectional area at one end of the body, the starting end portion having a length between about two times the diameter of the body of the core wire and about 1.25 inches, the end surface or tip of the starting end portion having a cross-sectional area between about twenty and about seventy percent of the cross-sectional area of the body, the starting end portion having less coating than an equivalent length of the body, the components of the electrode being proportioned so that the ratio of the quantity of coating consumed to the quantity of core wire consumed during the melting of the starting end portion is between about ninety and about one hundred ten percent of the ratio of the quantity of coating consumed to the quantity of core wire consumed during the melting of the body of the electrode.

2. A coated arc welding electrode for minimizing both porosity and variation in composition of the weld metal at the start of welding as claimed in claim 1 in which the coating is a stainless-low hydrogen type coating.

3. A coated arc welding electrode for minimizing both porosity and variation in composition of the weld metal at the start of welding as claimed in claim 1 in which the outer surface of the coating on the starting end portion of the core wire is of truncated cone shape.

4. A coated arc welding electrode for minimizing both porosity and variation in composition of the weld metal at the start of welding as claimed in claim 3 in which the starting end portion of the core wire is of truncated cone shape.

5. A coated arc welding electrode for minimizing both porosity and variation in composition of the weld metal at the start of welding as claimed in claim 4 in which the coating is a stainless-low hydrogen type coating.

6. A coated arc welding electrode for minimizing both porosity and variation in composition of the weld metal at the start of welding as claimed in claim 1 in which the starting end portion of the core wire has a length between about two times the diameter of the body of the core wire and about .8 inch, the end surface or tip of the starting end portion has a cross-sectional area between about twenty-five and about sixty percent of the cross-sectional area of the body and the components of the electrode are proportioned so that the ratio of the quantity of coating consumed to the quantity of core wire consumed during the melting of the starting end portion is between about ninety-five and about one hundred five percent of the ratio of the quantity of coating consumed to the quantity of core wire consumed during the melting of the body of the electrode.

7. A coated arc welding electrode for minimizing both porosity and variation in composition of the weld metal at the start of welding as claimed in claim 6 in which the outer surface of the coating on the starting end portion of the core wire is of truncated cone shape.

8. A coated arc welding electrode for minimizing both porosity and variation in composition of the weld metal at the start of welding as claimed in claim 7 in which the starting end portion of the core wire is of truncated cone shape.

9. A coated arc welding electrode for minimizing both porosity and variation in composition of the weld metal at the start of welding as claimed in claim 1 in which the components of the electrode are proportioned so that said relationship of ratios of the quantity of coating consumed to the quantity of core wire consumed during melting is established in the first increment of the length of the starting end portion equal to the diameter of the body of the core wire and is continued through subsequent equal increments of the length of the starting end portion all the way to the body of the core wire.

10. A coated arc welding electrode for minimizing both porosity and variation in composition of the weld metal at the start of welding as claimed in claim 2 in which the components of the electrode are proportioned so that said relationship of ratios of the quantity of coating consumed to the quantity of core wire consumed during melting is established in the first increment of the length of the starting end portion equal to the diameter of the body of the core wire and is continued through subsequent equal increments of the length of the starting end portion all the way to the body of the core wire.

References Cited
UNITED STATES PATENTS 3,231,332  1/1966  Jones et al. _____ 219—146
3,370,152  2/1968  Rolnick _____ 219—146

J. A. TRUHE, Primary Examiner

L. A. ROUSE, Assistant Examiner